US012703504B2

(12) United States Patent
Čretnik et al.

(10) Patent No.: US 12,703,504 B2
(45) Date of Patent: Aug. 11, 2026

(54) LANDING GEAR SYSTEM, WEIGHT ON WHEELS SYSTEM AND METHOD FOR LANDING OR TAKING-OFF

(71) Applicant: Pipistrel d.o.o., Ajdovscina (SI)

(72) Inventors: Gregor Čretnik, Ljubljana (SI); Patrik Toš, Ljubljana (SI)

(73) Assignee: Pipistrel d.o.o., Ajdovscina (SI)

( * ) Notice: Subject to any disclaimer, the term of this patent is extended or adjusted under 35 U.S.C. 154(b) by 88 days.

(21) Appl. No.: 18/736,385

(22) Filed: Jun. 6, 2024

(65) Prior Publication Data

US 2026/0042548 A1 Feb. 12, 2026

(51) Int. Cl.

| | |
|---|---|
| ***B64D 45/00*** | (2006.01) |
| ***B64C 25/60*** | (2006.01) |
| ***B64C 25/62*** | (2006.01) |
| ***B64U 10/20*** | (2023.01) |
| ***B64U 60/20*** | (2023.01) |

(52) U.S. Cl.

CPC .............. *B64D 45/00* (2013.01); *B64C 25/60* (2013.01); *B64C 25/62* (2013.01); *B64U 10/20* (2023.01); *B64U 60/20* (2023.01)

(58) Field of Classification Search

CPC ....... B64D 45/00; B64D 45/005; B64U 60/20

See application file for complete search history.

(56) References Cited

U.S. PATENT DOCUMENTS

| | | | | |
|---|---|---|---|---|
| 12,054,282 | B2 | 8/2024 | Trevisan | |
| 2023/0331376 | A1 | 10/2023 | Ensslin | |
| 2023/0399096 | A1 * | 12/2023 | Hachen | ................. B64U 60/40 |

FOREIGN PATENT DOCUMENTS

| | | | |
|---|---|---|---|
| GB | 2621160 | A | 2/2024 |
| WO | 2019227209 | A1 | 12/2019 |
| WO | 2023225745 | A1 | 11/2023 |
| WO | 2024084523 | A1 | 4/2024 |

* cited by examiner

*Primary Examiner* — Ashesh Dangol

(74) *Attorney, Agent, or Firm* — Slater Matsil, LLP

(57) ABSTRACT

A system includes a sensor assembly with a switch and configured to be mounted to a shock absorber, and a landing disc assembly connected to the sensor assembly, the landing disc assembly configured to contact a ground surface and to be mounted to the shock absorber, wherein the switch is configured to indicate a landing or a taking-off of an aerial vehicle from the ground surface.

19 Claims, 14 Drawing Sheets

LANDING GEAR SYSTEM, WEIGHT ON WHEELS SYSTEM AND METHOD FOR LANDING OR TAKING-OFF

TECHNICAL FIELD

The present invention relates generally to aerial vehicles and in particular embodiments to landing gear systems or weight on wheels (WOW) systems. The present invention also relates to a method for landing or taking off of an aerial vehicle.

BACKGROUND

Vertical take-off and landing (VTOL) aircrafts may need precise information whether the aircraft has landed or taken-off. Conventional landing gear systems may provide this information via certain compressions of their shock absorbers.

SUMMARY

In accordance with an embodiment a weight on wheels (WOW) system for a landing gear system includes a sensor assembly with a switch, the sensor assembly is configured to be mounted to a shock absorber, and a landing disc assembly connected to the sensor assembly, wherein the landing disc assembly is configured to contact a ground surface and to be mounted to the shock absorber, and wherein the switch is configured to indicate a landing or a taking-off of an aerial vehicle from the ground surface.

In accordance with another embodiment a landing gear for an aerial vehicle includes a landing gear shock absorber and a weight on wheel (WOW) system mounted to the landing gear shock absorber, wherein the WOW system is configured to activate a switch when landing forces of the aerial vehicle touching a ground surface pass a threshold of 75 N and to provide feedback of touching the ground surface to a flight control system of the aerial vehicle.

In accordance with yet another embodiment, a method for operating a take-off-and-landing-gear of an aerial vehicle includes touching, by a disc carrier of a landing disc assembly, a ground surface of a terrain during a landing phase and activating, by a switch activation element of the landing disc assembly, a switch arranged at the sensor assembly by moving the switch and the switch activation element in a vertical/axial direction towards each other, wherein the take-off-and-landing-gear comprises the landing disc assembly and the sensor assembly.

In accordance with a further embodiment a method for operating a take-off-and-landing-gear of an aerial vehicle includes taking-off, by a disc carrier of a landing disc assembly, from a ground surface of a terrain during a take-off phase and de-activating, by a switch activation element the landing disc assembly, a switch arranged at a sensor assembly by moving the switch and the switch activation element in a vertical/axial direction away from each other, wherein the take-off-and-landing-gear comprises the landing disc assembly and the sensor assembly.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments provide a landing gear system or a weight on wheels (WOW) system of an aerial vehicle (and in particular for a vertical take-off and landing (VTOL) aircraft or drone) that indicates contacting or touching ground much more precisely and reliably and much faster than conventional systems.

Embodiments provide switch activation indicating landing of an aerial vehicle independently from the main landing gear compression (shock absorber compression) during landing. The switch activation and therefore the triggering of a landing signal is (almost) immediate upon landing.

In various embodiments the WOW systems only requires low forces for switch activation. The required forces can be easily adjusted with different internal spring stiffnesses. For example, a spring element constant (stiffness) may be selected to be between 5 N/mm and 20 N/mm, or between 7 N/mm and 15 N/mm or between 8 N/mm and 10 N/mm or, alternatively, to be a factor 25 to a factor 15 smaller than a constant (stiffness) of a shock absorber. Moreover, the same WOW system configuration can be configured for different applications and/or different aerial vehicles.

In various other embodiments the WoW system may mounted directly to the landing gear shock absorber and indicates when aircraft is touching the ground or lifting off from the ground. The WoW system may provide signal that is not only used to prevent various systems of the aerial vehicle from operating inappropriately on the ground or in flight but also to act as a crucial input to an autopilot (of an UAV) during take-off or landing phases. The system design is advantageously delicate in contact detection but robust in its function to guaranty safe, reliable operation with redundancy. It provides precise immediate ground contact detection without relying on high forces and large displacements required to compress main landing gear and therefore a delay in received signal.

In yet other embodiments, the WOW system provides crucial information in addition to information provided by other systems of the VTOL for operating the UAV VTOL during the take-off and landing phases.

Figure 1:
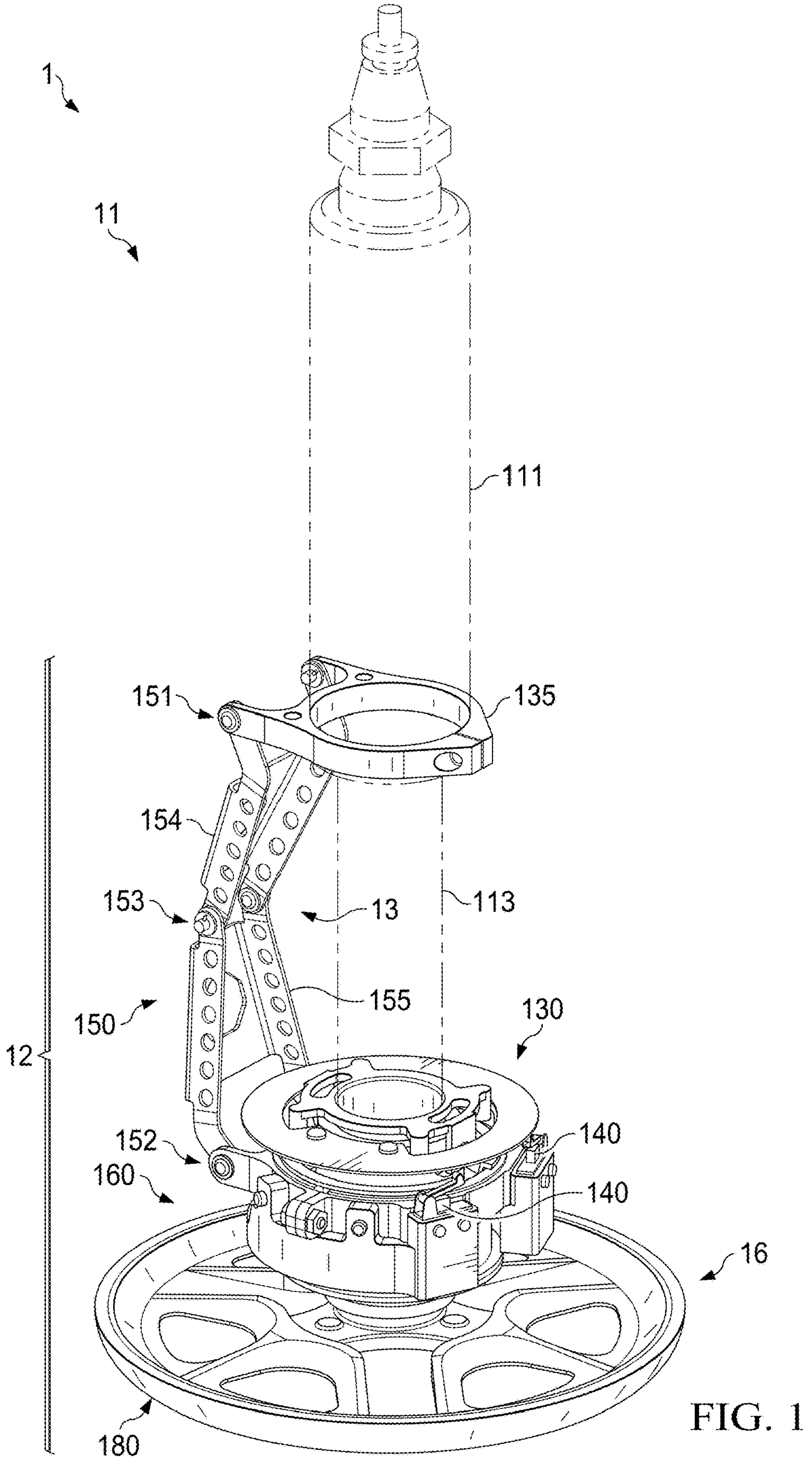
FIG. 1 shows weight on wheels (WOW) system for a landing gear shock absorber, the WOW system comprising a sensor assembly connected to a landing disc assembly according to embodiments.

FIG. 1 shows a perspective view of a weight on wheels (WOW) system 12. The WOW system 12 comprises a sensor assembly 13 and a landing disc assembly 16. The WOW system 12 may be part of a landing gear system 1 for an aerial vehicle. The landing gear system 1 may further comprise a shock absorber 11. In various embodiments an aerial vehicle may have 3 or more, 4 or more, 5 or more, or 6 or more such landing gear systems 1. The aerial vehicle comprising the landing gear systems may be an aircraft, a rotorcraft or a drone. In particular, it may be an unmanned aerial vehicle (UAV) VTOL aircraft.

As can be seen in FIG. 1, the WOW system 12 may be (directly) arranged at or mounted to a shock absorber 11. For example, the sensor assembly 13 is fixedly connected or fastened to the shock absorber fixed element 111 while the landing disc assembly 16 is fixedly connected or fastened to the shock absorber rotatable element 113. This arrangement allows the landing disc assembly 16 to be rotatable together with the shock absorber rotatable element 113 while the sensor assembly 13 is anchored to the shock absorber fixed element 111 and therefore is not rotatable relative to the shock absorber 11 and the aerial vehicle. In particular, the connection between the sensor assembly 13 and the landing disc assembly 16 is rotatably fixed via the base interface mount 130 (e.g. the switch sliding ring) of the sensor assembly 16 and the receiving area 1669 of the landing disc assembly 16. This arrangement is advantageous because the switches 140 of the sensor assembly 13 remain anchored or in a fixed position and don't move and as a result the respective connecting cables leading away from the switches 140 to the aerial vehicle controller don't move either and remain in place, which avoids the potential of winding up the cables around the shock absorber 11 and their potential rupture and premature wear and tear.

Figure 2A:
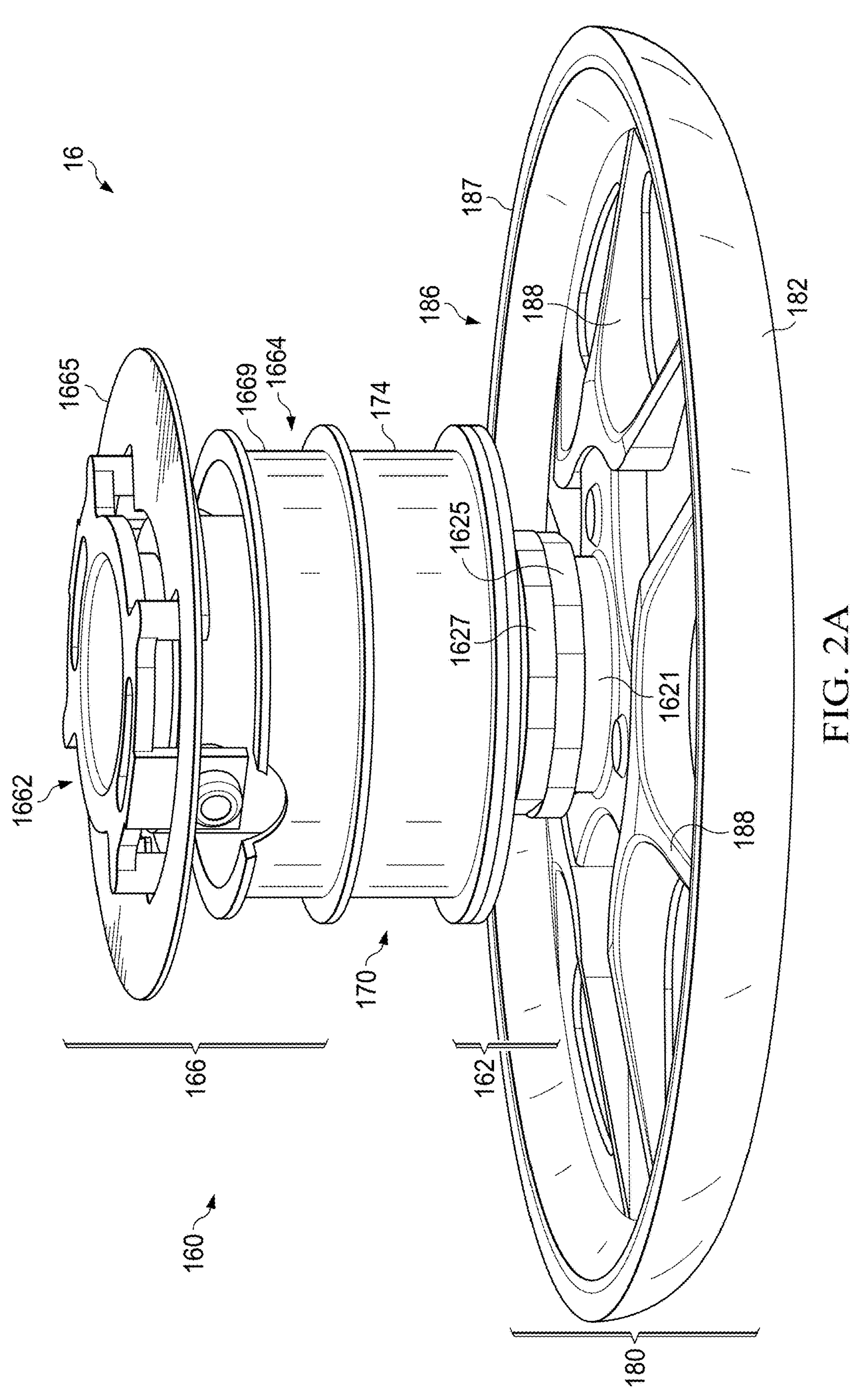
FIG. 2A-2B show a landing disc assembly according to embodiments.
Figure 2B:
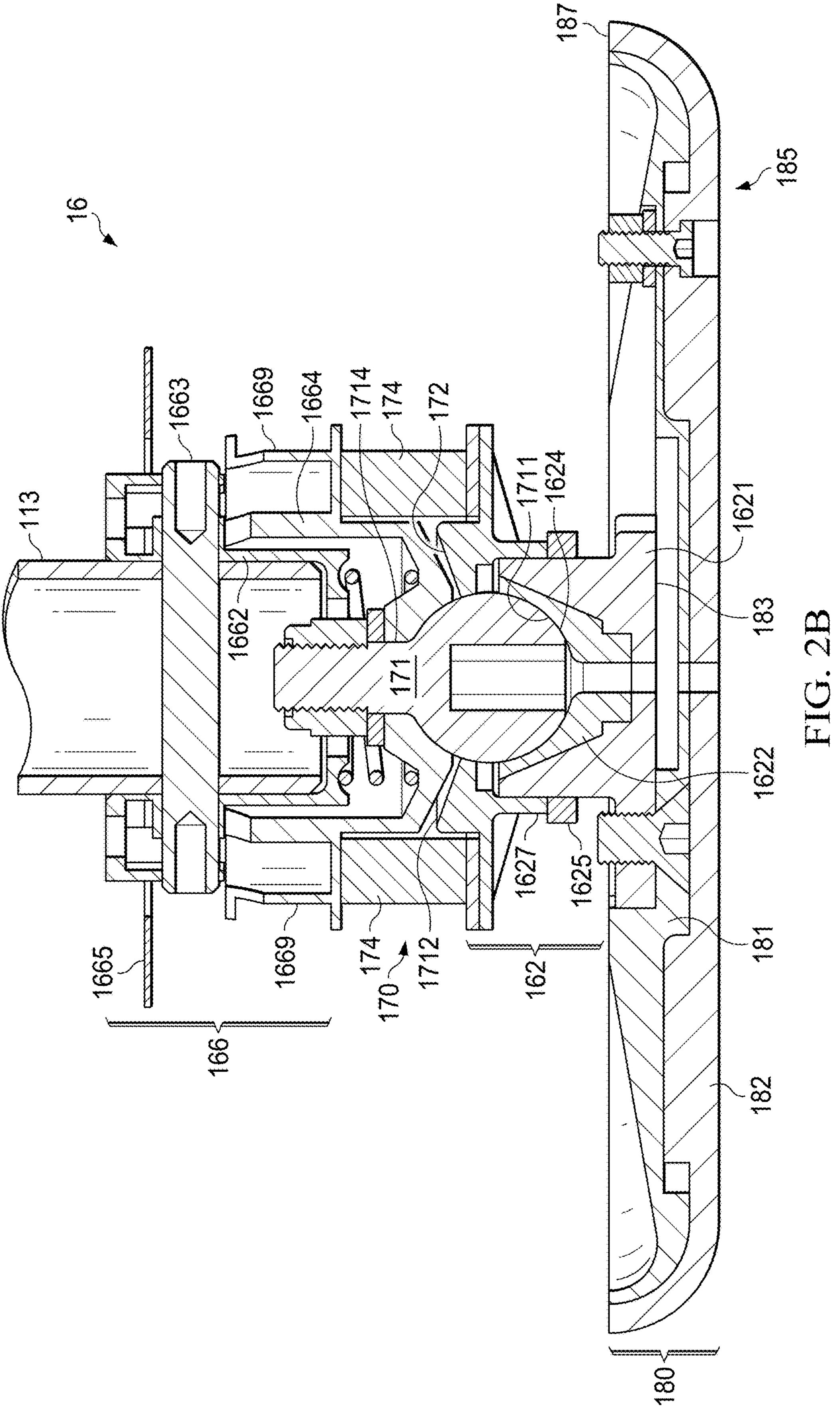

FIG. 2A shows a side view and FIG. 2B shows a cross-sectional view of an embodiment of the landing disc assembly 16.

The landing disc assembly 16 comprises a landing disc carrier assembly 180 and a connection element 160. The landing disc carrier assembly 180 comprises a landing disc carrier 181, a disc insert 182 and a central connecting area 183 for connecting the landing disc carrier assembly 180 to the connection element 160.

The landing disc carrier 181 may be the main load structure providing stability for the aerial vehicle on the ground. It may comprise an outer surface 185, an inner surface 186 comprising a central connecting area 183 at a central area and a rim 187 at a peripheral area. The outer surface 185 (and the inner surface 186) may be bent upwardly so that they form the rim 187. The outer surface 185 may comprise a recess or structure in which or to which the disc insert 182 is attached or inserted. The landing disc carrier 181 may be from a lightweight metal such as aluminum. The disc insert 182 may be made for or comprise polymer. The disc insert 182 is configured to touch ground when the aerial vehicle lands or is landed. The disc insert 182 may cover most or all of the outer surface 185 and may be easily removeable and replaceable (because of wear and tear).

The landing disc carrier 181 may be a round or circular disc carrier that is continuously and contiguously formed. It may have support spokes 188 or a web of support spokes 188 in order to stabilize and strengthen the disc carrier 181 while reducing the weight of it. The support spokes 188 extend from the peripheral area to the central area with the central connecting area 183 of the inner surface 186.

As previously mentioned the landing disc assembly 16 also comprises the connection element 160. The connection element 160 comprises a lower connection element 162 configured to provide connection to the landing disc carrier 181 and the sensor assembly, an upper connection element 166 configured to provide a connection to the shock absorber rotatable element 113 and a spherical joint 170 joining the lower connection element 162 and upper connection element 166.

The lower connection element 162 and in particular the connector 1621 may be arrangeable or arranged at the central connecting area 183. The connector 1621 may be screwed to, fastened to or integrated in the central connecting area 183.

The connector 1621 may be embodied as a (threaded) nut and may comprise a base bushing 1622. The base bushing 1622 may be inserted in the connector 1621 and may have a spherical surface on the inside. The lower connection element 162 may further comprises a main nut 1627 for connecting the connector 1621 with an upper part of the assembly (upper connection element 166 and/or spherical joint 170) and a lock nut 1625 that prevents the main nut 1627 from becoming unscrewed from the connector 1621.

The upper connection element 166 is configured to receive the shock absorber rotatable element 113, to activate the switches 140, to receive the upper spherical surface of the spherical surface element 171 and to receive the base interface mount 130 of the sensor assembly 13. The upper connection element 166 comprises an inner bushing 1662 and an outer bushing 1664. The outer bushing 1664 is guidable or movable on the inner bushing 1662 along an axial direction. The inner and outer bushings 1662, 1664 may comprise a cylindrical form inside and outside and may have a lower opening and an upper opening. The inner bushing 1662 is insertable, inserted or located in the upper opening of the outer bushing 1664 and the upper opening of the inner bushing 1662 is configured for receiving the shock absorber rotatable element 113. The lower openings of the inner and outer bushings 1662, 1664 are aligned so that they can receive the upper spherical surface of the spherical surface element 171. The inner bushing 1662 is mechanically connected to the outer bushing 1664 by spring element (s) 175. In other words, the spring element(s) 175 is/are inserted between the inner bushing 1662 and outer bushing 1664. A retaining element such as a shear pin 1663 connects the inner and outer bushings 1662, 1664. The outer bushing 1664 may have an oval vertical hole that allows the outer bushing 1664 to slide up and down on the inner bushing 1662. In various embodiments the inner bushing 1662 is configured to guide the outer bushing 1664.

The shock absorber rotatable element 113 can be fastened to the upper connection element 166 via a retaining element, such as a (shear) pin 1663 inserted through the outer and inner surfaces of the inner and outer bushings 1662, 1664 and the through the shock absorber rotatable element 113. Other means of fixing element 113 to element 166 can be used such as screws for screwing them together. The upper connection element 166 further comprises a switch activation element 1665. The switch activation element 1665 can be a switch activation ring. The switch activation element 1665 may sit on or in close proximation to the switches 140. The switch activation element 1665 may be flanged to or screwed to or otherwise fixed to the inner bushing 1662 and therefore extends beyond the outer surface of this bushing 1662 (and maybe beyond the outer surface of the outer bushing 1664). The switch activation element 1665 may be able to activate the switches 140 independently from its rotational position with respect to an axial direction. The ring of the switch activation element 1665 may have a thickness between 1 mm and 2 mm, inclusive, and may be in particular 1 mm thick.

The base interface mount 130 of the sensor assembly 13 can be rotatably fastened to the upper connection element 166. For example, the base interface mount 130 may be rotatably fastened to a receiving area 1669 of the outer surface of the outer bushing 1664. The receiving area 1669 may be arranged below the switch activation element 1665 and the (shear) pin 1663. The receiving area 1669 may be defined by two (metallic) ring extensions extending from the outer surface of the outer bushing 1664.

The upper connection element 166 and lower connection element 162 are connected via a joint 170 such as the spherical joint 170. The spherical joint 170 may comprise or may be embodied by the inner spherical surface 1624 of the base bushing 1622 and a spherical surface element 171 having a lower spherical surface 1711 being a counterpart of the inner spherical surface 1624 of the base bushing 1622. The lower spherical surface 1711 of the spherical surface element 171 and the inner surface 1624 together may form the spherical joint 170. The spherical surface element 171 may have an upper spherical surface 1714 in form, e.g., of a cylinder. The upper spherical surface 1714 may extend into the inner sides of the inner and outer bushings 1662, 1664. In cross section, the spherical surface element 171 may form a flask with a narrow width at the lower spherical surface, a narrow width at the upper spherical surface 1714 (e.g., being narrower than the width of the lower spherical surface) and a wide width at the spherical surface in-between. In various embodiments the spherical surface element 171 is connected with a nut or other means to the outer bushing 1664.

The spherical joint 170 is configured to provide compensation for uneven surfaces and landings at various angles of the ground surface. The spherical joint 170 may comprise a mechanical stop at a maximum angle (thereby compensating the unevenness of the ground surface up to this point). The maximum angle may be an angle of between 5 degrees and 15 degrees, inclusive, an angle of between 5 degrees and 10 degrees, inclusive, or alternatively, an angle of 5 degrees, 8 degrees, 10 degrees or 15 degrees. The mechanical stop may be incorporated by a gap 172 between an angled portion of an upper surface of the lower connection element 162 (e.g., the main nut 1627) and an angled portion of the lower surface of the upper connection element 166 (e.g., outer bushing 1664).

Dampener(s) 174 such as rubber dampener(s) may be placed between the upper connection element 166 and the lower connection element 162 and in particular between a radial extension of the outer bushing 1664 and a radial extension of the main nut 1627. The rubber dampener 174 may keep the spherical joint 170 stable mid-flight and may prevent dirt, water and/or other contaminants entering the spherical joint 170. The dampeners 174 can be easily changed based on wear and tear. The radial extension of the extensions between which the dampener 174 are located may have the same or a similar form as the (metallic) ring extensions of the receiving area 1669. The upper radial extension for the dampener 174 may be the same as the lower radial extension of the receiving area. The lower radial extension for the dampener may be part of the main nut 1627.

Spring element(s) 175 such as compression spring(s) may be arranged between the inner bushing 1662 and the outer bushing 1664. The spring element(s) 175 may define a force that triggers the switches 140. The spring element(s) 175 may be preloaded so that they provide sufficient force to defy all external loads and to prevent all external loads to trigger the switches mid-flight. External loads may include the load of the WOW system 12 or a portion thereof and/or aerodynamic loads. The spring element(s) 175 may be preloaded so that they start to compress at a threshold force of 75 N to 200 N, at a force of 75 N to 150 N, at a force of 75 N to 100 N, at a force of 75 N, at force of 85 N, at a force of 100 N or at a force of 110 N and so that the switches 140 are (indirectly) switched via the switch activation element 1665 when this threshold force is passed. This threshold force is substantially lower than force at which the shock absorber start to compress (approximately 1,500 N) and therefore advantageously indicates the landing of the aerial vehicle much more reliable, much faster and much earlier than the conventional system.

Figure 3:
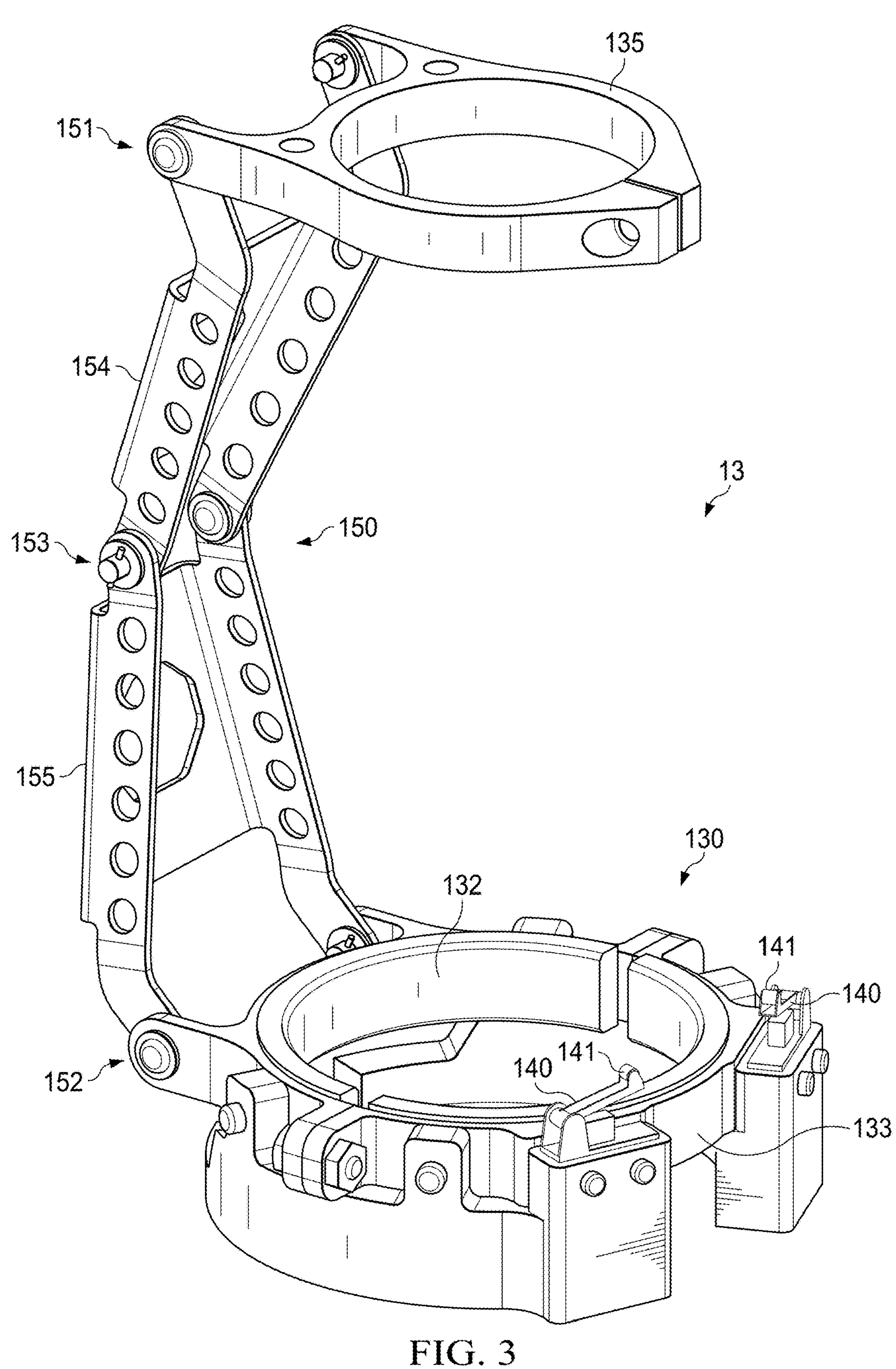
FIG. 3 shows a sensor assembly according to embodiments.

FIG. 3 shows an embodiment of a sensor assembly 13. The sensor assembly 13 may comprise a base interface mount 130, a link element 150, an upper interface mount 135 and switches 140. The base interface mount 130 is configured to be fixed or clamped to the landing disc assembly 16, the link element 150 links the base interface mount 130 to the upper interface mount 135 and the upper interface mount 135 is configured to be fixed or clamped to shock absorber fixed element 111. The upper interface mount 135 may comprise a clamp that is fastened to the shock absorber fixed element 111 by screwing the clamp to the absorber fixed element 111 until it is secured.

The link 150 may be a torsion link and may have two arms and three pivotal points. One arm 154 may be pivotally connected 151 via fasteners such as pins, screws, nuts and bolts, etc. to the upper interface mount 135, one arm 155 may be pivotally connected 152 via fasteners such as pins, screws, nuts and bolts, etc. to the base interface mount 130 and the arms 154, 155 may be pivotally 153 connected to each other via fasteners such as pins, screws, nuts and bolts, etc. The pivot points may be hinge points. All hinge points 151-153, but particularly the middle hinge point 153, may provide flexibility in positioning of the arms of the link 150 based on compression of the shock absorber 11. The link 150 may provide stability and strength to the sensor assembly 13.

The base interface mount 130 may comprise a sliding element 132 such as a sliding ring arranged within the clamp 133. The sliding element or ring 132 may be rotatable relative to the clamp 133. The clamp 133 (with the sliding element or ring 132 therein) may be fastened to the receiving area 1669 of the landing disc assembly 16 so that the sliding element or ring 132 sits directly on the receiving area 1669 and so that the receiving area 1669 and the sliding element or ring 132 is rotatable versus the clamp 133. Alternatively or additionally, the receiving area 1669 of the landing disc assembly 16 comprises a sliding element or ring 132 to which the clamp 133 is fastened so that the sliding element or ring 132 is rotatable versus the clamp 133. In some embodiments both the clamp 133 and the receiving area 1669 may comprise a sliding element or ring 132 connected or attached to each other.

The switches 140 may be one or more switches. The switches 140 may be arranged on the clamp 133 or on the support element 134 attached to the clamp 133. The switches 140 may be spaced apart (more than 10% or more than 20% of the upper circumference of the clamp 133 or less than 40% or less than 50% of the upper circumference of the clamp 133) from each other and arranged distal from the hinge point(s) 152 so that the link 150 does advantageously not interfere with the switching of the switches 140. In various embodiments, the switches 140 are mechanical switches. The mechanical switches 140 may have switching arms 141. The switching arms 141 may be moved, e.g., down, by the switch action element 1665 thereby switching the switches 140.

In various other embodiments the switches 140 are optical switches or electrical switches (e.g., inductive switches). In these embodiments one part of the optical/electrical switch is arranged at switch action element 1665 and the other part of the optical/electrical switch is arranged at the clamp 133 or the support element 134.

The switches are electrically connected to a control unit (controller, microprocessor) of a flight control system such as an autopilot of the aerial vehicle via cables guided or routed through the support element 134. For example, each switch 140 is connected to the control unit via a separate and independent cable.

Figure 4:
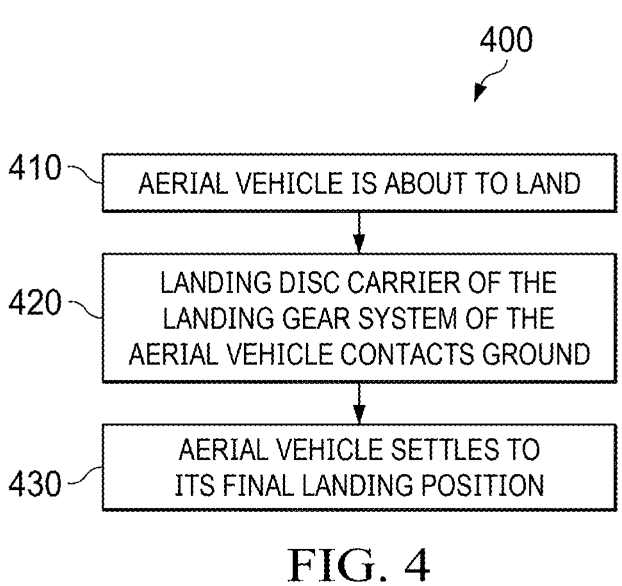
FIG. 4 shows a method for landing of an aerial vehicle according to embodiments.

FIG. 4 shows an embodiment method 400 for signaling that a landing gear system of an aerial vehicle has touched ground, i.e., a ground surface, during a landing phase. The landing gear system may comprise the shock absorber, the landing disc assembly and the sensor assembly, as, for example, described in FIG. 1. The landing disc assembly (and the shock absorber rotatable element) may be rotatably connected relative to the sensor assembly (and the shock absorber fixed element).

In a first step, at 410, the aerial vehicle is about to land. The shock absorber is operationally at its maximum extended position. The upper connection element of the landing disc assembly and in particular the switch activation element (e.g., switch activation ring) is spaced apart from the sensor assembly and in particular from the switches so that the switches are not switched or, e.g., turned on (e.g., switching arms are not pressed). The spring(s) of the landing disc assembly keeps the landing disc assembly and the sensor in this position so that the switches are not accidently switched.

In a second step, at 420, the landing disc carrier of the landing disc assembly of the landing gear system contacts ground, i.e., the ground surface. By touching the ground surface the force of the shock absorber (e.g., the shock absorber rotatable element) on the upper connection element overcomes the biased spring force between the inner and outer connection elements so that the switches and the switch activation element move towards each other and so that the switch activation element triggers the switches. For example, the switch activation element arranged at the inner connection element is pressed against the switches of the sensor assembly (rotatably) fixed to the outer connection element. This action switches the switches, i.e., the switches are switched on. The shock absorber is still in its maximum extended position or near its maximum extended position (within 1% or within 2% of its maximum extended position). The switches, by being switched, provide a (landing) signal to a controller (control unit) of the flight control system of the aerial vehicle via cables.

The switch is activated or switched almost instantly upon landing, i.e., the switches switch less than 0.05 s, less than 0.03 s or less than 0.01 s upon the landing disc carrier contacting ground.

In a third step, at 430, the aerial vehicle settles to its final landing or resting position and compresses the shock absorber. The shock absorber may be compresses up to its maximum compressed position.

Figure 5A:
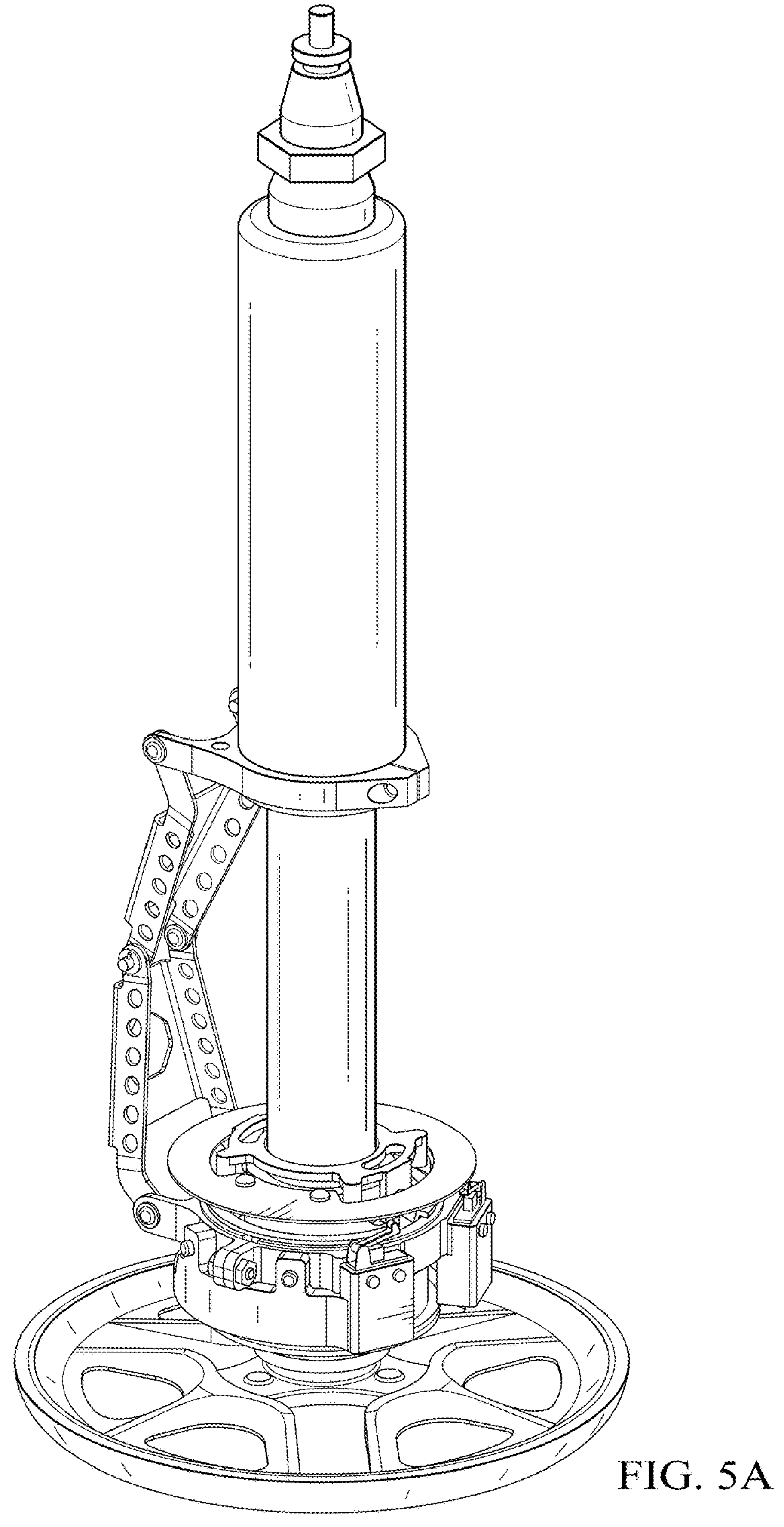
FIGS. 5A-5C show a compression of a landing gear system when an aerial vehicle lands according to embodiments.
Figure 5B:
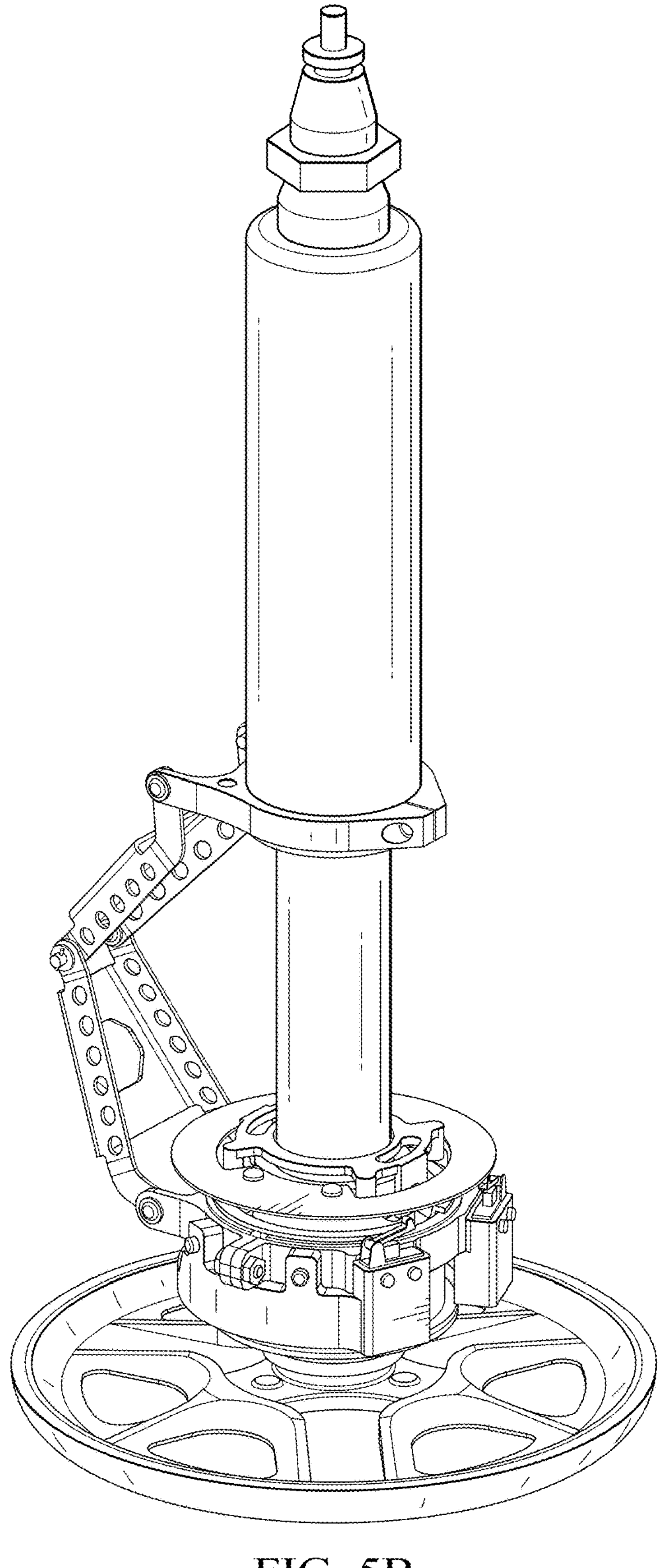
Figure 5C:
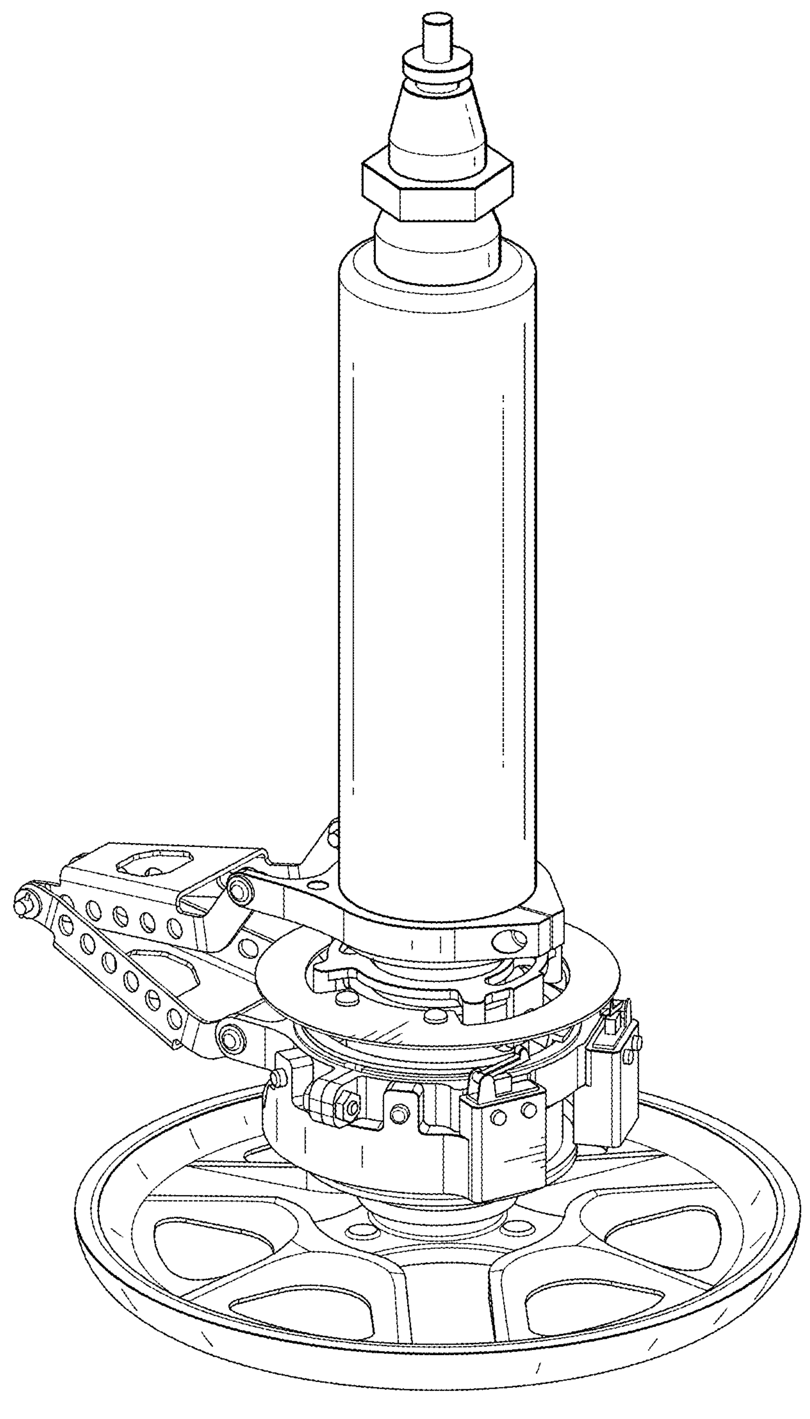
Figure 6A:
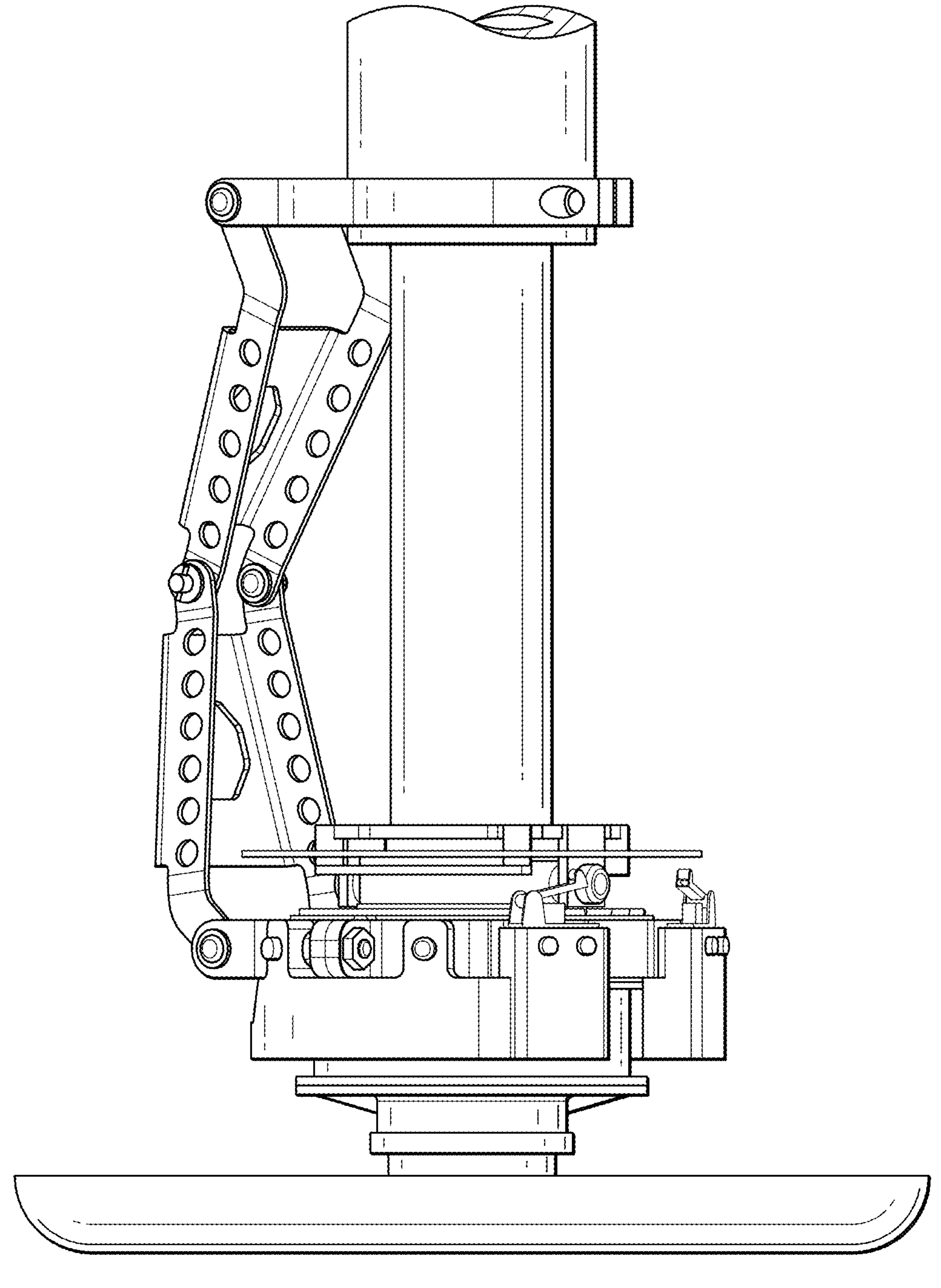
FIGS. 6A-6F show a movement of a weight on wheel (WOW) system when an aerial vehicle lands according to embodiments.
Figure 6B:
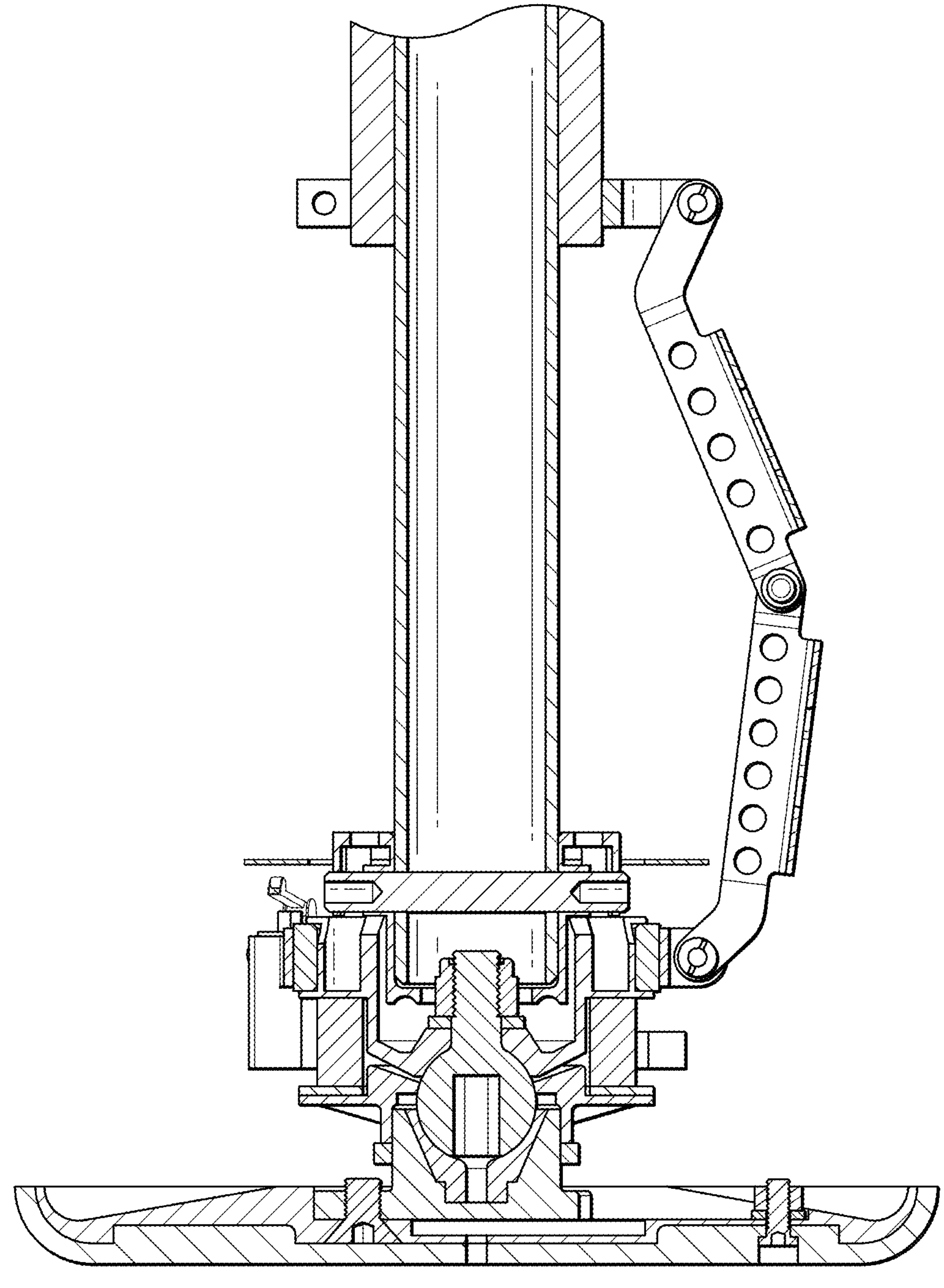
Figure 6C:
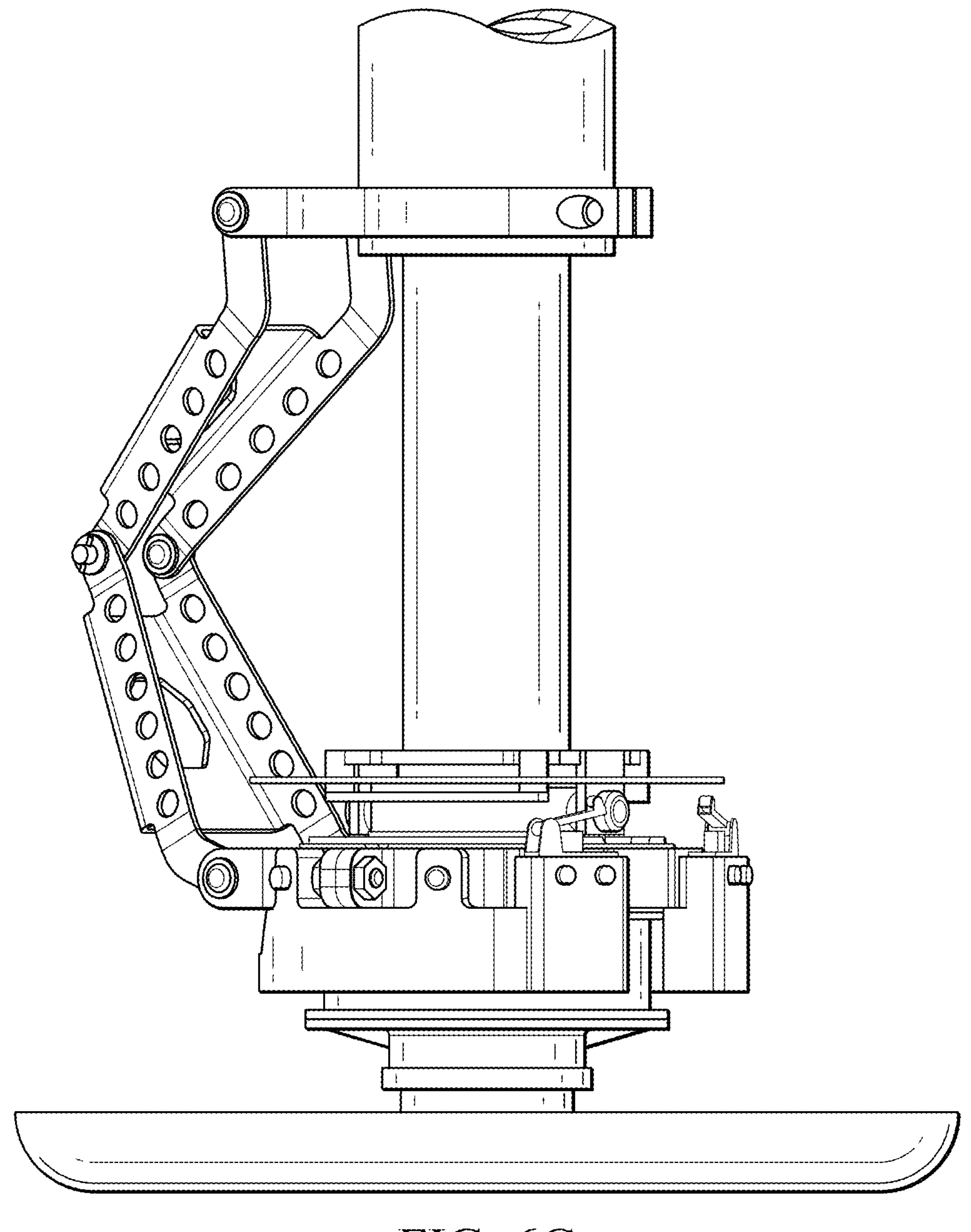
Figure 6D:
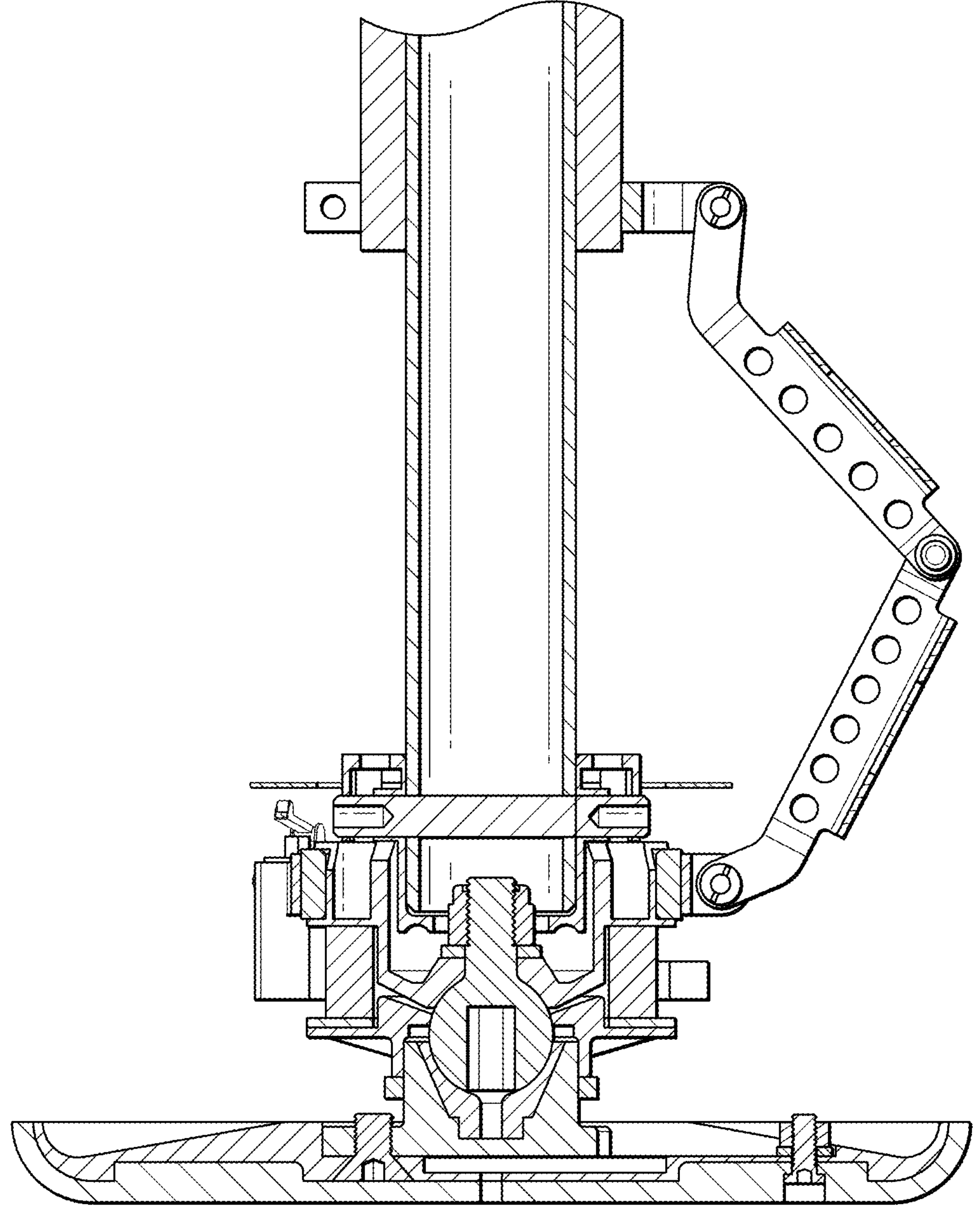
Figure 6E:
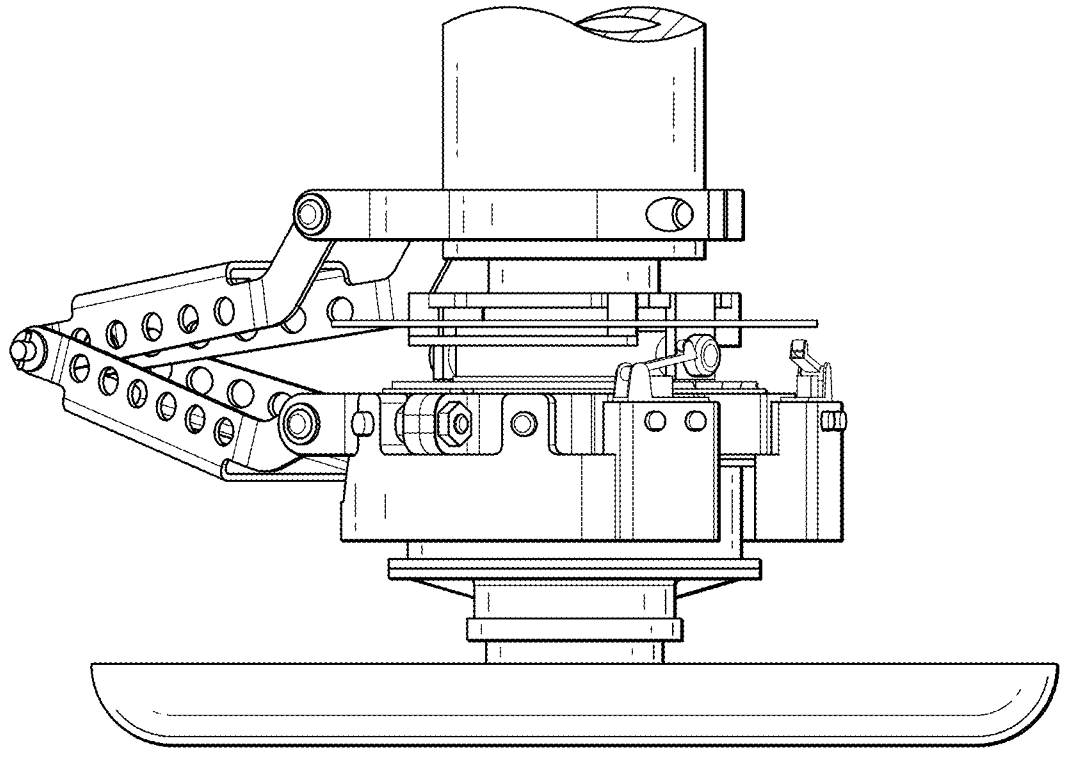
Figure 6F:
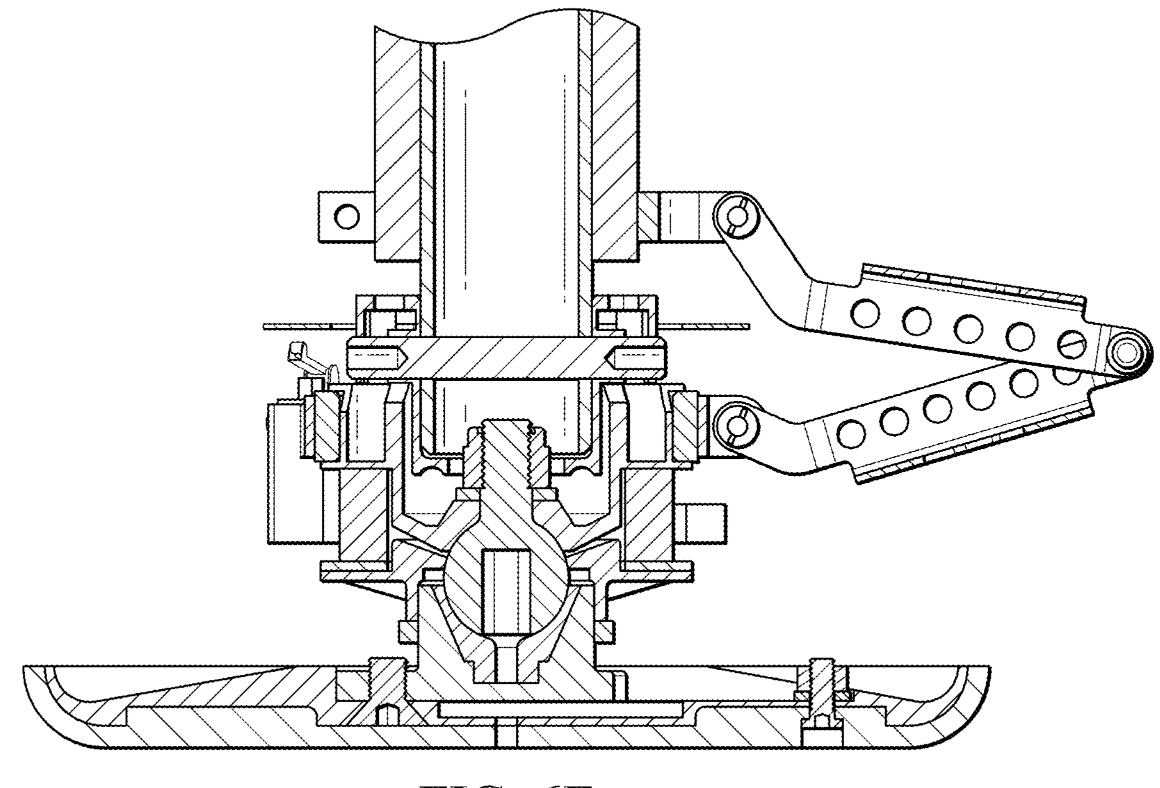

FIGS. 5A-5C show the landing gear system 1 during the different operational steps 1 (410), 2 (420) and 3 (430) and FIGS. 6A-6F show the WOW system 12 (in two different perspectives) during these steps.

An embodiment method reverse to that of FIGS. 4, 5A-5C and 6A-6F describes a method for signaling that a landing gear system (or a WOW system) of an aerial vehicle has taken off from the ground surface during a take-off phase.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system comprising:

a sensor assembly comprising a switch and configured to be mounted to a shock absorber; and a landing disc assembly connected to the sensor assembly, the landing disc assembly configured to contact a ground surface and to be mounted to the shock absorber, wherein the landing disc assembly comprises a connection element and a disc carrier assembly, wherein the connection element comprises:

an upper connection element comprising an inner bushing configured to connect to the shock absorber and an outer bushing, wherein the inner bushing is insertable into the outer bushing, a lower connection element fastened to the disc carrier assembly, and a spherical joint connecting the upper connection element and the lower connection element, and wherein the switch is configured to indicate a landing or a taking-off of an aerial vehicle from the ground surface.

2. The system of claim 1, wherein the sensor assembly is rotatably mounted to the landing disc assembly.

3. The system of claim 1, wherein the switch is a mechanical switch.

4. The system of claim 1, wherein the switch is an optical switch or an electrical switch.

5. The system of claim 1, wherein the inner bushing comprises an opening configured to receive a shock absorber rotatable element of the shock absorber, wherein the outer bushing comprises a lower opening fastened to a spherical connection element, and wherein a retaining element fixes the shock absorber rotatable element to the upper connection element.

6. The system of claim 1, wherein the upper connection element further comprises a switch activation ring configured to trigger the switch.

7. The system of claim 6, further comprising a spring connecting the inner bushing to the outer bushing so that the outer bushing is movable with respect to the inner bushing and so that the switch is movable with respect to the switch activation ring.

8. The system of claim 7, wherein the spring is configured to start compressing at a force in a range of 75 N to 150 N.

9. The system of claim 1, wherein the spherical joint comprises a mechanical stop at a maximum angle.

10. The system of claim 9, wherein the maximum angle is 5 degrees.

11. The system of claim 1, wherein the sensor assembly comprises:

a base interface mount having a sliding element and a clamp, the sliding element fastened to the upper connection element and rotatably connected to the clamp;

an upper interface mount comprising a clamp, the clamp of the upper interface mount configured to be clamped to a shock absorber fixed element; and a link element connecting the clamp of the base interface mount with the clamp of the upper interface mount.

12. The system of claim 11, wherein the link element is pivotally connected to the clamp of the base interface mount and pivotally connected to the clamp of the upper interface mount.

13. The system of claim 11, wherein the switch comprises a plurality of switches, and wherein the plurality of switches are arranged on a side of the clamp of the base interface mount distal to the link element.

14. A landing gear comprising:

the system of claim 1, wherein the landing gear is configured to be mounted on the aerial vehicle.

15. The system of claim 1, wherein the system is a weight on wheels system.

16. A landing gear for an aerial vehicle, the landing gear comprising:

a landing gear shock absorber; and a system mounted to the landing gear shock absorber, the system configured to:

activate a switch by forces occurring when the aerial vehicle touches a ground surface, wherein the switch is activated when the forces pass a threshold of 75 N; and provide feedback to a flight control system of the aerial vehicle when the forces pass the threshold, wherein the system comprises:

a sensor assembly comprising the switch, and a landing disc assembly comprising a landing disc carrier, wherein the landing disc assembly is configured to activate the switch, wherein the sensor assembly is fastened to a shock absorber fixed element of the landing gear shock absorber, wherein the landing disc assembly is fastened to a shock absorber rotatable element of the landing gear shock absorber, and wherein the sensor assembly is rotatably connected to the landing disc assembly.

17. The landing gear of claim 16, wherein the sensor assembly is rotatably mounted to the landing disc assembly.

18. The landing gear of claim 16, wherein the switch is a mechanical switch.

19. The landing gear of claim 16, wherein the switch is an optical switch or an electrical switch.

* * * * *